United States Patent Office 2,854,090
Patented Sept. 30, 1958

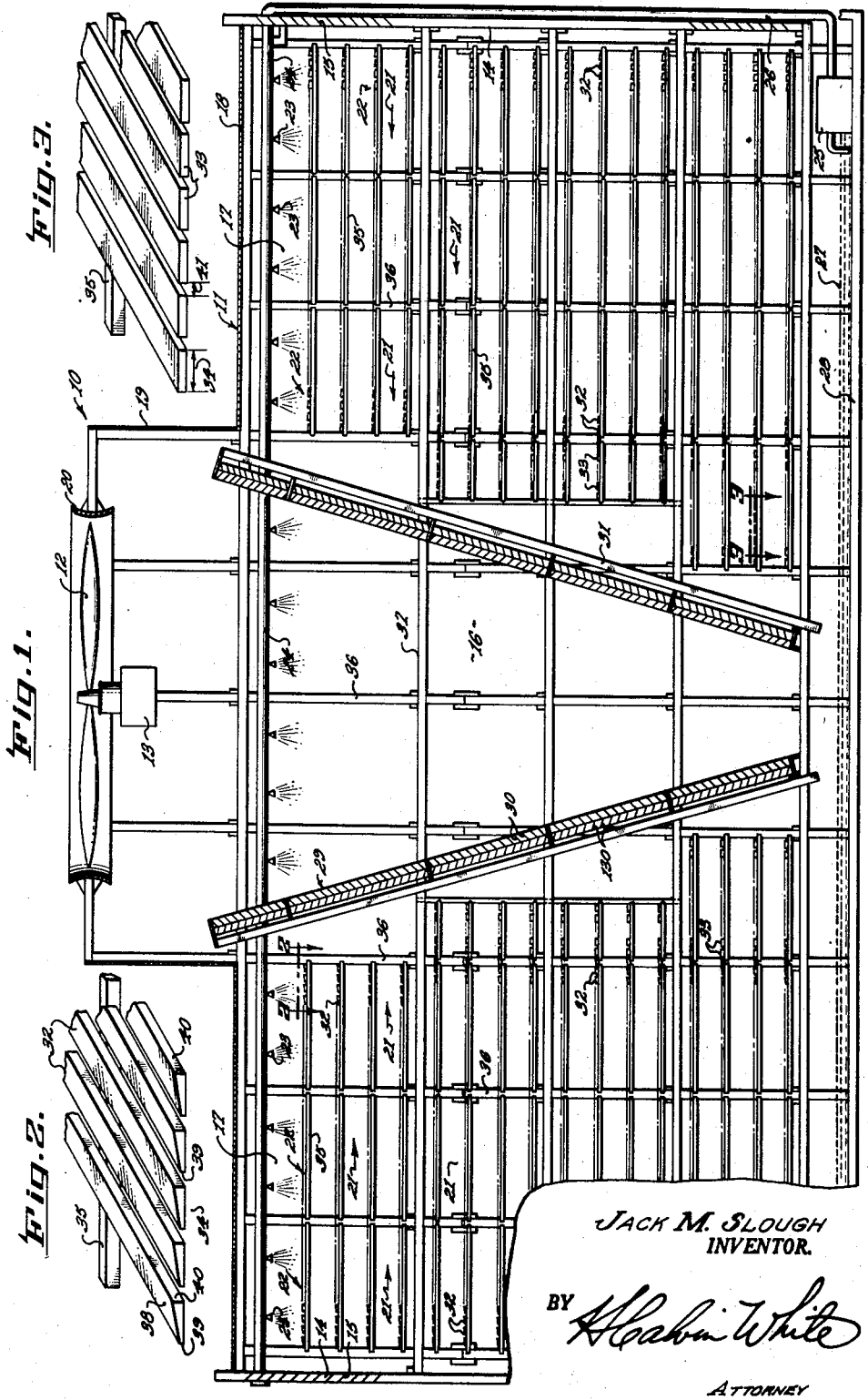

1

2,854,090

CROSSFLOW COOLING TOWER

Jack M. Slough, Covina, Calif., assignor to The Fluor Corporation, Ltd., Los Angeles, Calif., a corporation of California Application December 24, 1956, Serial No. 630,231

7 Claims. (Cl. 183—26)

This invention relates to improved cooling towers, for cooling water by contact with a flow of air, and the invention is particularly concerned with improvements in the "crossflow" type of cooling tower.

A crossflow cooling tower is one in which the water to be cooled is passed downwardly within the tower, while the cooling air flows essentially horizontally, that is, transversely of the direction of water movement. As the water falls downwardly from upper spray nozzles or other distributing means, the water successively engages a series of decks formed of a large number of spaced slats, on which the water forms a film from which the air may readily absorb heat. The air draft may be produced by a fan acting to draw air upwardly at one side of the deck structure, and as a result causing a horizontal flow of air through the decks from an inlet side of the housing. In many installations, this fan is positioned at a central location, and draws air horizontally inwardly in two opposite directions from opposite sides of the cooling tower housing.

In prior crossflow installations of the above general type, certain inefficiencies have been introduced into the tower by reason of an undesired interaction between the flow of water and the flow of air in the tower, resulting in very ineffective heat transferring characteristics in a large portion of the apparatus. More specifically, one of these difficulties resides in the tendency of the horizontally moving air to carry some of the water horizontally with it, with the result that by the time the water reaches the lower portion of the tower, it has shifted inwardly away from the air inlet side or sides of the tower, and thus does not cover the deck structures near those sides completely enough for efficient heat transfer in that area. Further, as the air moves horizontally inwardly, the heating of the air by the water tends to cause the air to progressively rise, so that the air does not properly flow past some of the lower deck structures, thus resulting in another area having poor heat transfer conditions.

The general object of the present invention is to provide a cooling tower structure which will overcome at least one and preferably both of the above discussed disadvantages of prior arrangements, to thereby assure optimum heat transferring conditions in all decked portions of the tower. For instance, in order to prevent the described tendency for horizontal or inward shifting movement of the water with the air, I specially form the slats to counteract this tendency by providing the slats with upper preferably inclined surfaces which advance upwardly as they advance in the horizontal direction of air flow. The water then tends to run by gravity along these surfaces in a direction counter to the direction of air flow, so that the two counteracting tendencies for water advancement in opposite horizontal directions act together to cause the water to fall essentially directly downwardly through the entire tower.

The tendency for rising movement of the air as it flows horizontally is minimized by positioning the slats of each deck in very closely spaced relation. Thus, the air is effectively confined between vertically successive slatted decks, and flows horizontally between those decks without substantial flow upwardly through any of the decks. For this purpose, the slats may have horizontal widths which are at least about three times as great as their horizontal spacing. The greatest dimensions or lengths of the slats should desirably extend essentially transversely of the horizontal direction of air flow.

The above and other features and objects of the present invention will be better understood from the following detailed description of the typical embodiment illustrated in the accompanying drawing in which:

Fig. 1 is a central vertical section through a cooling tower constructed in accordance with the invention;

Fig. 2 is an enlarged fragmentary perspective view of a portion of one of the slatted decks of the tower, and Fig. 3 is an enlarged fragmentary perspective view of an inner end portion of one of the slatted decks.

Referring first to Fig. 1, the illustrated cooling tower 10 includes an essentially rectangular housing 11 through which air is drawn by a fan 12 driven by a motor typically represented at 13. The housing 11 has two parallel vertical opposite side wall structures 14, each of which consists of a series of vertically spaced inclined louvers 15 between which air flows horizontally inwardly through walls 14 to the central area 16 of the housing. At its opposite ends, housing 11 has two parallel preferably imperforate vertical walls 17, extending perpendicular to side wall structures 14, and desirably each extending across an entire end of the housing (only one wall 17 shown). The top horizontal wall 18 of housing 11 is also preferably imperforate, except at the location of a central upwardly extending air outlet 19 within which fan 12 is mounted for powered rotation about a vertical axis. The air outlet structure 19 may be closed to air discharge therefrom except through a tubular shroud 20 which is disposed about fan 12.

In flowing through the housing toward fan 12, the air enters the two inlet side walls 14, and then flows inwardly in opposite directions from these side walls toward central area 16, as indicated by arrows 21. During such horizontally inward flow, the air contacts and removes heat from water which is falling downwardly within the cooling tower housing at the locations of two series of vertically spaced horizontal slatted decks 22. Water falls onto and through these decks 22 from a series of horizontally spaced spray nozzles 23, or other means for sprinkling the water downwardly in divided form. These spray nozzles may typically be connected to a common header or headers 24 to which water is supplied under pressure by a pump 25 through a line 26. Pump 25 may act in conventional manner to take at least a portion of its water from an accumulated body of water 27 within sump 28 at the bottom of the cooling tower.

After the air passes horizontally inwardly beyond decks 22, the air flows through water eliminator units 29, which may converge essentially downwardly, as shown, and each of which preferably extends along the entire length of the housing between end walls 17. These water eliminator units 27 may be of conventional construction, each typically including a first series of inclined spaced parallel slats 30, and a second series of parallel slats 130 disposed at an angle to slats 30, to provide somewhat circuitous paths for the air as it flows through eliminator units 29 and between the slats thereof, to thus remove entrained moisture from the air before the air flows upwardly within central area 16 for discharge past fan 12. The water eliminator units 29 may of course be rigidly mounted in the cooling tower structure by any suitable type of framework, typically represented at 31.

Each of the vertically spaced decks 22 is formed of a series of closely horizontally spaced parallel elongated slats 32 or 33, whose lengths preferably extend transversely of the direction of horizontal air flow past the slats, that is, the lengths of slats 32 and 33 preferably extend perpendicular to imperforate end walls 17 of the housing. The widths 34 of these slats in the direction of horizontally inward air flow should be at least about twice as great as their maximum vertical thickness. The slats of a particular deck may be mounted in their illustrated positions in any suitable manner, as by horizontal frame members 35, vertical frame members 36, and additional and larger horizontal frame members 37 as required.

As the water is sprayed downwardly from nozzles 23 onto slatted decks 22, the water forms a film on the surfaces of slats 32 and 33, and progressively falls or drips downwardly from one deck to the next lower deck, until the water ultimately reaches sump 28. The horizontally inwardly flowing air contacts the water on and falling between decks 22, to remove heat from the water and thus produce the desired cooling effect on the water.

As will be apparent, there is necessarily a tendency for the inwardly flowing air to carry with it some of the downwardly falling water, with a result that the water may tend to gradually move inwardly toward water eliminators 29 as the water approaches the lowermost decks 22. To prevent such inward shifting of the water as it falls downwardly, most of the slats of decks 22 are given the configuration of slats 32 in Fig. 2. More specifically, the upper surface 38 of each of these slats 32 is inclined progressively upwardly as it advances horizontally inwardly toward the central region 16 of the tower, to give the water a counteracting tendency to flow downwardly along the inclined surfaces 38 toward the outer edge 39 of each of the slats, rather than toward its inner edge 40. This tendency for outward movement of the water along the upper inclined surfaces of the slats is just sufficient to counteract the inward water shifting tendency of the horizontally moving air so that the water falls essentially directly downwardly through the entire height of the tower, thus resulting in an effective heat transferring action throughout the deck structure. For best results, the upward inclination of upper surfaces 38 of slats 32 may be between about three and fifteen degrees to the horizontal. All of the slats forming the various decks 22 may have these inclined upper surfaces, with the exception of the relatively few slats 33 which are located beneath the inclined water eliminator units 29. These latter slats 33 may have horizontal upper surfaces, rather than inclined surfaces, as seen best in Fig. 3.

In order to prevent the horizontally inwardly moving air from gradually rising upwardly as it flows inwardly between decks 22, the slats 32 and 33 of decks 22 are positioned in very closely spaced relation, to thus effectively confine the air flow between successive decks with a minimum possibility of the air flowing upwardly through the decks. For this purpose, the horizontal widths 34 of the slats 32 and 33 should be at least about three times as great as the horizontal spacing 41 between successive slats. For example, the slat width 34 may be about three inches, while the spacing 41 may be about one inch, optimum results being achieved when approximately this three to one ratio is being maintained.

In placing the cooling tower in operation, motor driven pump 25 is energized to commence the delivery of water under pressure to spray nozzles 23, and the motor driven fan is placed in operation to cause air to flow horizontally inwardly from the opposite sides 14 of the tower past decks 22 and water eliminators 29, and to then flow upwardly between the water eliminators for discharge from the housing past the fan. The water which falls downwardly through and past the decks 22 is progressively cooled by the horizontally flowing air, and of course the temperature of the air correspondingly rises as it flows through the tower. The inclination of the upper surfaces 38 of slats 32 tends in the previously described manner to prevent horizontally inward shifting movement of the water as it falls downwardly, and the close spacing of adjacent slats in each of the decks 22 prevents the air from gradually advancing upwardly as it flows horizontally between the decks. Thus, the water falls directly downwardly along its entire course of flow, and the air flows directly horizontally inwardly along its entire course of flow, with the result that the water and air are in very effective heat transferring relation in all parts of the deck structure, to thus maximize the efficiency of the tower.

I claim:

1. A crossflow cooling tower comprising a housing, a series of vertically spaced horizontally extending decks in the housing, each deck being formed of a series of spaced elongated horizontally extending slats, means for passing water to be cooled downwardly through said vertically spaced decks and between the slats forming said decks, and a fan for producing a flow of air in a horizontal direction through said housing and between said decks to cool said downwardly falling water, said slats being elongated in a direction extending horizontally and transversely of said direction of air flow between the decks, said slats forming the decks having undersurfaces which extend directly horizontally and which are aligned with one another in a common horizontal plane within each of the decks, at least some of said slats having upper surfaces which are inclined progressively upwardly as they advance in said direction of air flow to progressively increase the thickness of the individual slats between said horizontal undersurfaces and said inclined upper surfaces as they advance in said direction of air flow.

2. A crossflow cooling tower as recited in claim 1, in which said upper surfaces of the slats are inclined progressively upwardly at an angle between about 3° and 15° to the horizontal and to said horizontal undersurfaces of the slats as said upper surfaces advance in said direction of air flow.

3. A crossflow cooling tower as recited in claim 1, in which the individual slats of said decks have horizontal widths in the direction of air flow which are as great as their vertical thickness.

4. A crossflow cooling tower as recited in claim 1, in which the individual slats of said decks have horizontal widths in the direction of air flow which are at least as great as about three times the spacing between adjacent slats in the direction of said widths.

5. A crossflow cooling tower as recited in claim 1, in which said fan is positioned beyond said slats along the path of air flow, there being an inclined drift eliminator structure beyond said slats and in advance of said fan, there being additional slats beneath said inclined structure aligned horizontally with said decks and having upper surfaces which are substantially directly horizontal.

6. A crossflow cooling tower as recited in claim 1, in which said housing has two air inlets at two opposite sides of the housing from which air flows horizontally inwardly in two opposite directions toward a central portion of the housing, there being two sets of said slats along the path of inward air flow from said two inlets respectively, said fan being positioned at said central portion of the housing and acting to blow air upwardly from said central portion to the atmosphere, there being water eliminators between said two sets of slats and said fan, said eliminators extending essentially at opposite inclinations, there being additional slats beneath said eliminators aligned horizontally with said decks and having upper slat surfaces which are substantially directly horizontal.

7. A crossflow cooling tower as recited in claim 1, in which said upper surfaces of the slats are inclined at an angle between about 3° and 15°, the individual slats of said decks having horizontal widths in the direction of air flow which are at least about three times as great as the horizontal spacing between adjacent slats in said direction, and are more than twice as great as their maximum vertical thickness.

References Cited in the file of this patent

UNITED STATES PATENTS

| | | |
|---|---|---|
| 1,092,334 | Burhorn | Apr. 7, 1914 |
| 2,247,514 | Mart | July 1, 1941 |
| 2,497,389 | Ahrens | Feb. 14, 1950 |
| 2,733,055 | Ophuls et al. | Jan. 31, 1956 |
| 2,776,121 | Fordyce | Jan. 1, 1957 |

FOREIGN PATENTS

| | | |
|---|---|---|
| 16,724 | Great Britain | July 30, 1903 |
| 518,373 | Great Britain | Feb. 26, 1940 |